(12) United States Patent
Sauer et al.

(10) Patent No.: US 8,111,883 B2
(45) Date of Patent: Feb. 7, 2012

(54) SYSTEM AND METHOD FOR PER-PATIENT LICENSING OF INTERVENTIONAL IMAGING SOFTWARE

(75) Inventors: Frank Sauer, Princeton, NJ (US); Norbert Rahn, Forchheim (DE); Chenyang Xu, Allentown, NJ (US); James Williams, Nürnberg (DE)

(73) Assignees: Siemens Medical Solutions USA, Inc., Malvern, PA (US); Siemens Aktiengesellschaft, Munich (DE)

( * ) Notice: Subject to any disclaimer, the term of this patent is extended or adjusted under 35 U.S.C. 154(b) by 1202 days.

(21) Appl. No.: 11/643,284

(22) Filed: Dec. 21, 2006

(65) Prior Publication Data

US 2007/0179817 A1    Aug. 2, 2007

Related U.S. Application Data

(60) Provisional application No. 60/756,468, filed on Jan. 5, 2006.

(51) Int. Cl.
*G06K 9/00* (2006.01)

(52) U.S. Cl. ....................................................... 382/128
(58) Field of Classification Search ........... 382/128–134
See application file for complete search history.

(56) References Cited

U.S. PATENT DOCUMENTS

| 6,574,742 | B1 * | 6/2003 | Jamroga et al. | 713/400 |
| 2001/0042021 | A1 * | 11/2001 | Matsuo et al. | 705/26 |
| 2002/0029264 | A1 * | 3/2002 | Ogino et al. | 709/223 |
| 2002/0128842 | A1 * | 9/2002 | Hoi et al. | 704/260 |
| 2002/0161718 | A1 * | 10/2002 | Coley et al. | 705/59 |

* cited by examiner

*Primary Examiner* — Alex Liew
(74) *Attorney, Agent, or Firm* — Donald B. Paschburg; F. Chau & Associates, LLC (57) ABSTRACT

A method for implementing per-use licensing for image processing software includes acquiring image data from an image scanner. Processed image data is calculated from the image data using an image processing module. The processed image data is exported. The use of the image processing module is logged in an accounting database when the processed data are exported. Access to the accounting database is provided for account settlement.

26 Claims, 5 Drawing Sheets

SYSTEM AND METHOD FOR PER-PATIENT LICENSING OF INTERVENTIONAL IMAGING SOFTWARE

CROSS-REFERENCE TO RELATED APPLICATION

The present application is based on provisional application Ser. No. 60/756,468, filed Jan. 5, 2006, the entire contents of which are herein incorporated by reference.

BACKGROUND OF THE INVENTION

1. Technical Field

The present disclosure relates to software licensing and, more specifically, to a system and method for per-patient licensing of interventional imaging software.

2. Discussion of the Related Art

Minimally-invasive medical procedures such as needle or catheter based ablations play an increasingly important role for therapy delivery. The benefits of these minimally invasive approaches include lower patient morbidity, faster recovery and reduced costs. These advantages come with the challenge for physicians to perform these procedures in a precise, safe and efficient way. Medical imaging technology provides physicians with visual feedback for performing these procedures, especially where direct line-of-sight is not possible.

Medical imaging includes pre-procedure image acquisition and intraoperative imaging. Different sensor systems may be employed to acquire image data. For example, sensors may be used to measure electrocardiogram (ECG) signals and respiratory motion. Systems may also track position and orientation of instruments.

Medical imaging sensors are used to collect image data, and this data may then be processed to generate the desired two or three dimensional image. Medical imaging systems include sensors for acquiring image data, computer software for processing the image data and computer hardware for executing the computer software and displaying the processed image.

In addition to facilitating minimally-invasive surgery, processed medical images may facilitate diagnosis and treatment of disease, congenital defect and injury.

The design of modern computer software for the processing of medical images has become quite complex and expensive. Developers of medical imaging systems have traditionally recouped software expenses by adding this cost to the sale price of the accompanying equipment. The sale of the medical imaging systems has traditionally included a general license to use the software in connection with the hardware. However, as image processing software evolves, it becomes increasingly difficult for software developers to recoup their investment by adding to the one-time cost of the medical imaging systems.

Moreover, adding the price of the software to the system cost often makes the system too costly for facilities with a limited caseload such as rural and community hospitals.

SUMMARY

A method for implementing per-use licensing for image processing software. Processed image data is calculated from image data using an image processing module. The processed image data is exported. The use of the image processing module is logged in an accounting database when the processed data are exported. Access to the accounting database is provided for account settlement.

A system for implementing per-use licensing for image processing software. A terminal receives image data. An image processing server executes a processing module for processing the image data and an accounting module for accounting for the processing of the image data by generating accounting data. An accounting database stores the accounting data.

A computer system includes a processor and a program storage device readable by the computer system, embodying a program of instructions executable by the processor to perform method steps for implementing per-use licensing for image processing software. The method includes processing data with a processing module. The processed data is exported. The use of the data processing module is logged in an accounting database when the processed data are exported. Access to the accounting database is provided for account settlement.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION OF THE EXEMPLARY EMBODIMENTS

In describing the exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention implement systems and methods for the licensing of medical image processing software on a per-patient basis. These systems and methods are also applicable to the licensing of other software packages on a per-use basis.

By shifting the recoupment of software development expenses to a per-patient basis, human and capital resources may be further attracted to the development of medical imaging software. Moreover, imaging systems may be more affordable to medical practice facilities with limited caseloads. Accordingly, the capabilities of future medical imaging technologies may be enhanced and the availability of current medical imaging technologies may be maximized.

Figure 1:
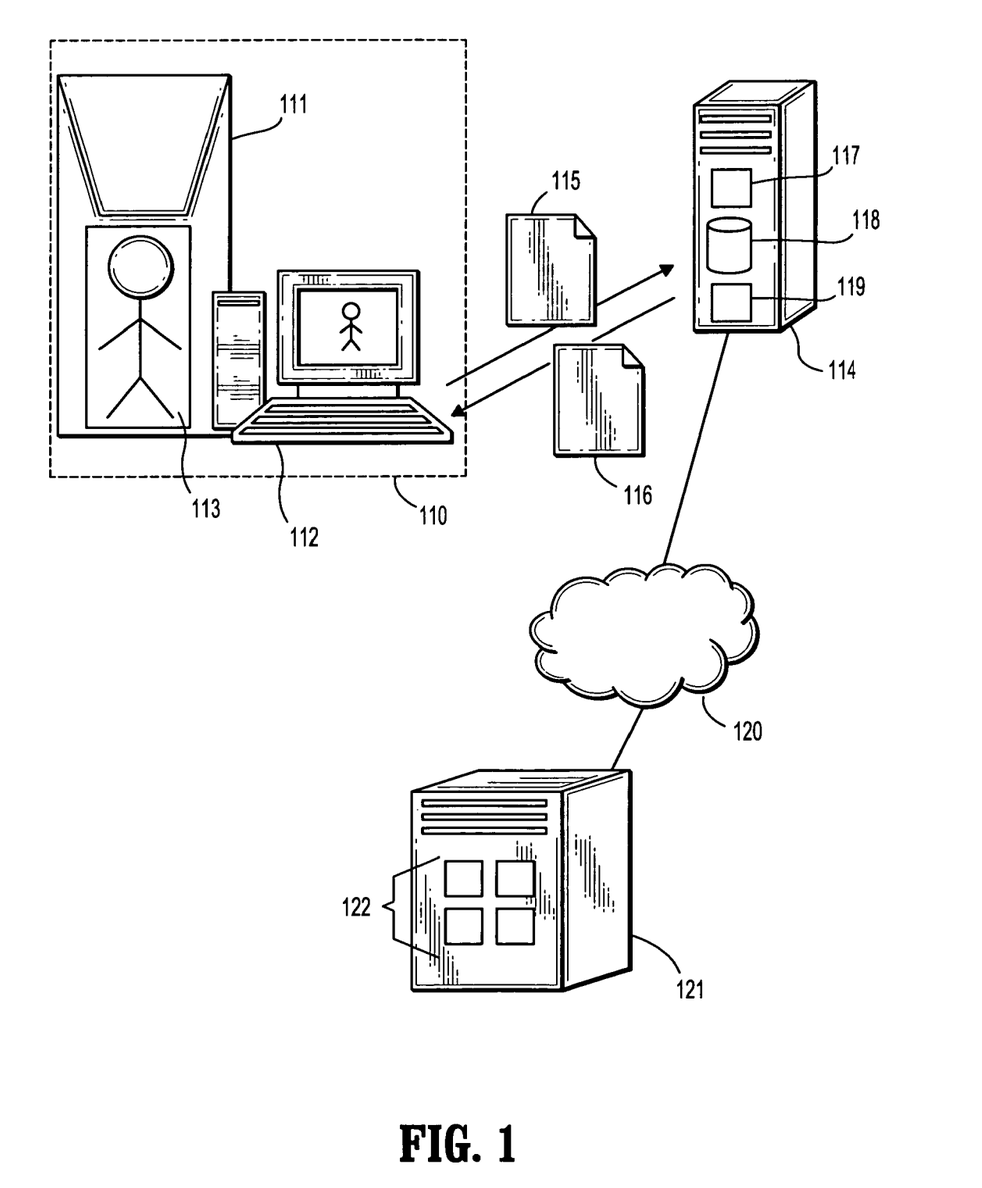
FIG. 1 illustrates a system for image processing according to an exemplary embodiment of the present invention.
Figure 2:
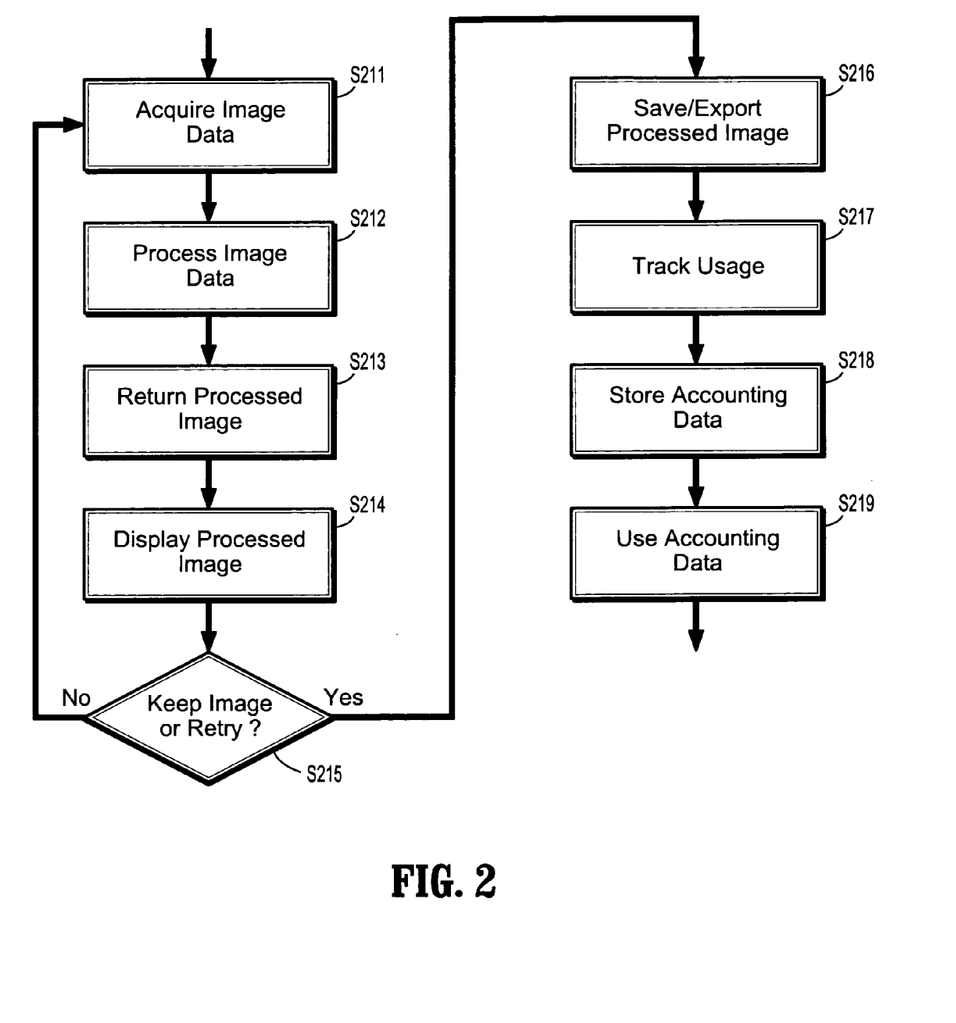
FIG. 2 is a flowchart illustrating a method for image processing according to an exemplary embodiment of the present invention.

FIG. 1 illustrates a system for image processing according to an exemplary embodiment of the present invention. FIG. 2 is a flowchart illustrating a method for image processing according to an exemplary embodiment of the present invention. An optional image acquisition system 110 may include one or more sensor devices 111. The sensor devices 111 may be, for example, an x-ray device, a magnetic resonance device, an ultrasound device, an electromagnetic detector device, or any other form of light, sound, electromagnetic or radionuclide radiation detector. The optional image acquisition system 110 may further include a terminal 112 interfaced with the one or more sensor devices 111. The terminal 112 may be used to control the sensor devices 111 and may be adapted to receive signals from the sensor devices 111. The sensors 111 may be digital, analog or a combination thereof. Where the sensors 111 are digital, digital image data may be sent to the terminal 112. Where the sensors 111 are analog, the analog signals may be sent to the terminal 112 where they may be digitized to digital image data. Alternatively, the analog signals may be digitized by an analog-to-digital converter connected between the sensors 111 and the terminal 112.

The image acquisition system 110 is optional to the present exemplary embodiment because image data 115 may be acquired (Step S211) by either scanning a patient 113 using the image acquisition system or image data 115 may be acquired (Step S211) by retrieving image data 115 from a source, for example, a source database. Alternatively, exemplary embodiments of the present invention may acquire image data (Step S211) by any suitable means.

The acquired image data 115 may be sent, for example, from the terminal 112, to an image processing server 114 (Step S211). The image processing server 114 may be executed on a separate computer system or may be integrated with the terminal 112 on a single workstation. The image processing server 114 may be a single server dedicated to a single acquisition system 110 or the processing server 114 may serve multiple acquisition systems 110 throughout the medical practice facility. The image processing server 114 may process the image data using an image processing module 117 (Step S212). The image data may be processed along with other patient information, for example, position data acquired with optical or electromagnetic tracking systems, ECG signals, and/or input from other sensors.

Image data may be sent to the image processing server 114 in any digital format, either compressed or uncompressed. The characterization of the image data as image data should not be understood to mean that the image data are necessarily uncompressed. For example, image data may be formatted and communicated in conformance with Digital Imaging and Communications in Medicine (DICOM) standards.

DICOM is a comprehensive set of standards for handling, saving/archiving, printing, sending, receiving and transporting data pertaining to medical imaging and related patient data. Standards include file format definitions and network communications protocols. DICOM medical image data may be exchanged between devices such as scanners, servers, workstations, image processors, printers, removable media, mass storage, etc. Such equipment may be configured to support one or more DICOM classes, with each DICOM class defining a particular set of DICOM standards. DICOM is widely adopted by hospitals and other institutions of medical practice.

According to many implementations of DICOM standards, image data is stored along with related patient data. For example, a digital x-ray image may be stored along with a patient ID so that stored image data can be easily referenced to a particular patient. Image data may be compressed using a number of compression standards including the JPEG standard and variations thereof. Image data compression may be either lossless or lossy.

After the image has been processed, the processed image data 116 may be sent back to the image acquisition system 110 (Step S213), for embodiments that utilize the image acquisition system, for example, for display on the terminal 112 (Step S214). Where no image acquisition system 110 is used, the display terminal 112 may be freestanding. The processed images may be displayed on the terminal 112 as part of a "front-end" navigation application for viewing acquired images and performing other related functions. The processed image may be formatted and communicated in conformance with standards, for example, DICOM standards.

Images may be processed individually or continuously. The processed images may be used by medical professionals, for example, for planning and/or guiding medical procedures. For example, where the processed images are used to provide a surgeon with visual feedback during a minimally invasive operation, images may be continuously processed in real-time.

The processed images may be reviewed at the terminal 112 to determine if the image should be kept or retaken (Step S215). If it is determined that the image should not be kept (No, Step 215) then the patient may be rescanned (Step S210). If it is determined that the image should be kept (Yes, Step S215) then the processed image may be saved locally and/or exported to a centralized location over a local area computer network such as an intranet (Step S216).

An accounting module 119 may be implemented, for example within the image processing server 114. Alternatively, the accounting module 119 may be implemented in a separate server, for example, an accounting server. The accounting server may track per-patient usage of the processing module 117 and attribute each usage to a particular account (Step S217). The accounts may be user specific so that each use is attributable to a particular user such as a technician or physician. Alternatively or additionally, accounts may be patient specific so that each use may be attributable to a particular patient.

The accounting module 119 may be preprogrammed with definition files that indicate what events are accounted for. Some events may therefore be accounted for while other events are not. For example, acquiring a scan and processing an image that is not saved may not be accounted for while saving or exporting a processed image may be accounted for. For example, providing a continuous set of processed images for use during a minimally invasive operation may be accounted for.

The usage tracked by the accounting module 119 may be stored locally as accounting data, for example in a local database 118 (Step S218). Data stored to the local database 118 may be printed or copied to removable media, for example, a recordable CD. This information may then be used for periodic billing purposes (Step S219). Alternatively, or additionally, the accounting data may be sent directly to a central location, for example, a Hospital Information System (HIS) 121 via a WAN 120, for example, the Internet. The HIS 121 may directly and automatically receive the accounting data on an ongoing basis and/or may receive the accounting when initiated by a user, for example, after a procedure. The HIS 121 may use the received accounting data to generate a bill for the use of the software or to otherwise keep track of and settle accounts, for example, by adding the cost of the per-patient license to the patient's hospital bill. As the HIS 121 may perform additional functions, one or more functional modules 122 within the HIS 121 may be adapted to handle the accounting data. The billing function performed by the HIS 121 may be integrated with medical-record keeping applications. The processed medical images themselves, or a version thereof, may be associated with a patient's bill and/or a patient's medical record.

The HIS, also known as a clinical information system (CIS), is a comprehensive integrated information system for the management of administrative, financial and clinical matters of a hospital or other institution of medical practice. The HIS may manage paper-based data and/or digital data. The HIS may be embodied by one or more computer systems including servers, workstations and other digital devices. All devices may be connected over a local area network (LAN) such as an intranet. Larger systems may be interconnected over a wide area network (WAN) such as the Internet. A virtual private network (VPN) may be utilized to ensure the integrity and privacy of HIS data communicated over the WAN. In addition to managing administrative data, medical data such as patient records may be stored in association with the HIS. One example of a common feature handled by the HIS is the generation of medical bills.

A Radiology Information System (RIS) may be used as an alternative to a HIS. A RIS is used by a medical practice group such as a radiology department to store, manipulate and distribute patient radiological data and images. The system may also perform patient tracking, scheduling, result reporting and image tracking.

Figure 4:
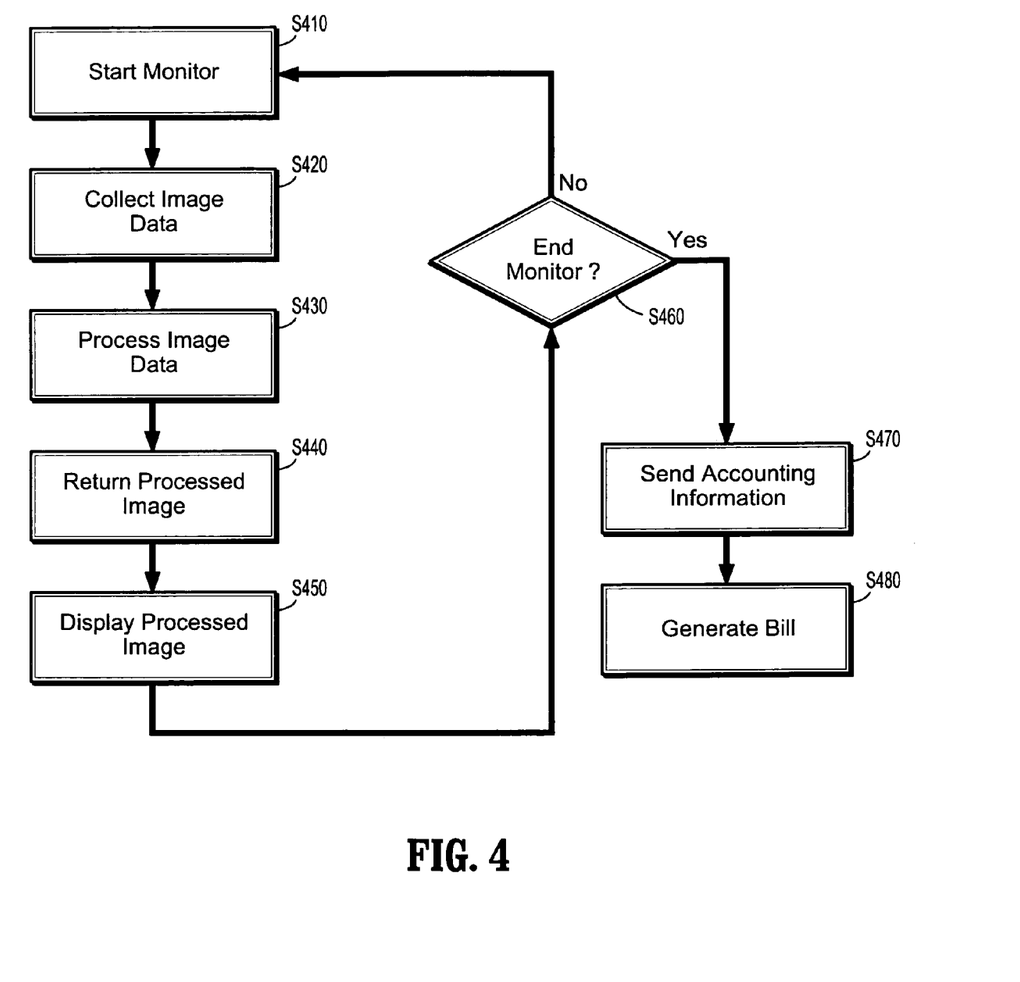
FIG. 4 is a flowchart illustrating a method for charging on a per-patient basis for continuous image processing in support of a minimally-invasive operation or procedure according to an exemplary embodiment of the present invention.

Exemplary embodiments of the present invention may also provide for charging on a per-patient basis for continuous image processing in support of a minimally-invasive operation or procedure. FIG. 4 is a flowchart illustrating a method for charging on a per-patient basis for continuous image processing in support of a minimally-invasive operation or procedure according to an exemplary embodiment of the present invention. When the patient has been prepared for surgery, imaging may begin with starting the image monitoring process (Step S410). Image data may be collected (Step S420), for example, by ultrasound. The image data may represent a single frame of an animated image. The image data may be processed by the image processor (Step S430). The processed image data may be returned to an operating table monitor (Step S440). The returned processed image data may be displayed on the operating table monitor (Step S450). This cycle of acquiring, processing and displaying images may provide a real-time animated image of the patient's internal structure. This animated image may be used to visualize the surgical field during the minimally-invasive operation. The cycle may repeat until the monitoring process has terminated (Yes, Step S450). For example, after the operation has been completed, the monitoring process may be manually terminated. Upon termination, accounting information including the type of image processing performed, may be forwarded to the accounting module (Step S470). Accounting information may, for example, may include the type of image processing performed and/or the number of images processed or the length of time for which image processing has been provided. Alternatively, the accounting information may include information indicating that image processing has been used. The accounting information may then be used to generate a patient's hospital bill (Step S480). According to one exemplary embodiment of the present invention, the bill may reflect a single charge for the use of image processing. Alternatively, or additionally, the bill may reflect the number of images processed and/or the length of time for which imaging has been provided. A charge may be calculated with reference to a database of charges which may be periodically updated as needed and/or with reference to the number of images processed and/or the length of time for which imaging has been provided.

According to an exemplary embodiment of the present invention, electro physiology procedures (EP) such as catheter based RF ablation may be performed to provide therapy for atrial fibrillation with image processing charged for on a per-patient basis. For this purpose, an application may be provided for the processing of image data to provide a variety of visualization, segmentation, and registration tools to support the EP procedure.

Data may be acquired and processed without being accounted for where the stored data are displayed but remains within the local application. The resulting processed images may be exported to other applications at which point, use may be accounted for. Storage of processed images may be stored to local drives without incurring charges. The processed images may be stored, for example, in accordance with the DICOM standards, for example, on a DICOM compatible network storage device. The storing of processed images may be accounted for by the accounting module so that accurate billing may be provided in accordance with the above disclosure. For example, storage to non-local drives such as network drives and removable media may be tracked by the accounting module. According to one exemplary embodiment, processed images may be transmitted and stored in an encrypted form. The exporting of processed images may then involve a decryption step. Accounting may then be linked to the decryption step. The accounting module may be executed, for example, as part of the HIS as described above.

One or more front-end applications may be used for the management of the processed images. Examples of front-end applications include: CARTO system provided by Biosense-Webeter, Navigant provided by Stereotaxis, and other commercially available systems. Exportation of the processed image to the front-end application may be accounted for. The front-end application may be executed on the terminal, the image processing server, or on any other computer networked thereto. Multiple front-end applications may be made available to the user and the user may have the ability to select from the available front-end applications. The processed image data may then be exported to the selected front-end application. In exporting the processed image, a standardized protocol may be used. For example, DICOM may be used. Where standardized protocols such as DICOM are used, the user may be prompted to provide appropriate attributes such as a study instance UID. Alternatively, appropriate attributes may be automatically provided with or without user input.

When an export operation is performed, accounting information may be generated. As discussed above, an accounting database may be used to store the generated accounting information as accounting database entries. Double accounting may be prevented by first checking to see if an export operation associated with the processed image has already been accounted for prior to generating a new accounting database entry. Accounting may be handled, for example, by the HIS in a manner consistent with the way commercially available HIS handle accounting for other hospital services. This handling may include, but is not limited to, the periodic generation of patient medical bills and/or claim submission to patient health insurance providers. The charge for software processing use may appear as a separate line-item and/or as part of a charge for the rendering of the medical imaging service.

Figure 3:
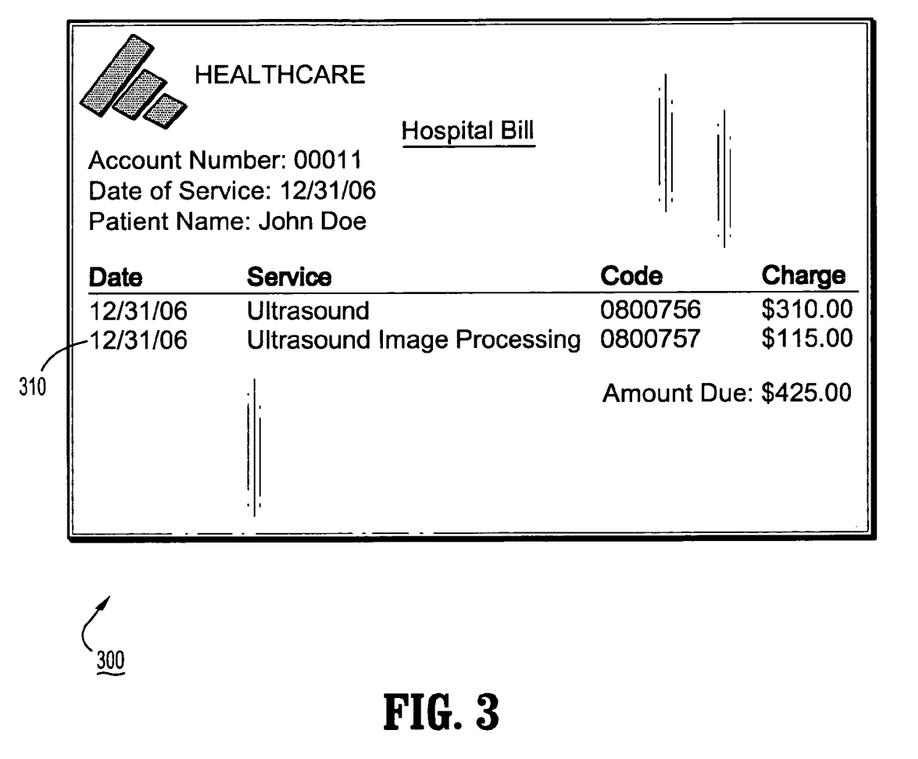
FIG. 3 is an illustration of a sample hospital bill according to an exemplary embodiment of the present invention.

FIG. 3 is an illustration of a sample hospital bill according to an exemplary embodiment of the present invention. A sample hospital bill 300 may include a separate charge for an image processing fee 310 that appears as a separate line item. In this example, an ultrasound is listed as a first line item with a first charge and the image processing fee 310 is listed as a second line item with a second charge. The total amount due is represented as the sum of the charge for the scan, in this case, the ultrasound, and the image processing charge.

Using the systems and methods of the above disclosure, a per-patient licensing approach for image processing software may be enforced. According to one exemplary embodiment, the hospital or healthcare practice facility may initially be charged for the image processing in accordance with the entries in the accounting database. The hospital or practice facility may then seek reimbursement from the patient and/or insurance provider. Application modules may interface directly with the accounting database to provide this functionality automatically. Alternatively, the provider of the front-end application or any other third-party application that calls upon the image processing system may be charged for the image processing. Virtual keys may be provided to the third-party application providers so that the image processing functionality may be properly utilized. The front-end application could then be programmed to provide the image processing module with the appropriate virtual key as image processing is desired. The virtual key provided may then be used to determine the account to which the use accounting is associated with. In these cases, the provider of the third-party application may access the accounting data to generate bills, for example, on a regular basis. The third-party providers may periodically access the systems on-site to receive accounting information or they may receive the information over a wide area network (WAN) such as the Internet.

According to another exemplary embodiment of the present invention, the image processing module and the accounting module may be directly integrated into a third-party application. In such an-embodiment, the application may derive a unique ID from the DICOM series instance UID. Where protocols other than DICOM are used, an API function call may be used to generate the unique ID from user input or some other means. The unique ID may then be used as part of a key to gain access to the image processing tools incorporated into the application. The unique ID may be stored in an encrypted file so that unauthorized use may be restricted. Accounting information associated with the use of the image processing tools may then be periodically retrieved and/or automatically sent to the billing center so that the accounts may be settled.

It is understood that features of the above-described exemplary embodiments may be arranged and combined to form additional embodiments of the present invention. Moreover, one or more features may be varied without departing from the intended scope of the present disclosure. For example, the above described embodiments may be applied to interventional and/or diagnostic images. Image processing may be integrated with final navigation and/or front-end software so that image data may be processed and utilized without having to export acquired and processed images to other applications. Alternatively, navigation and/or front-end functionality may be provided by a third-part application. Accounting functionality may be handled by the third-party application. The per-patient accounting described above may be applied to the use of the entire application rather than image processing modules/tools. As an alternative to the per-patient accounting approach, a per-procedure accounting approach may be used so that multiple procedures performed on a single patient may generate multiple accounting database entries and the account may be settled accordingly.

It should also be understood that the above-described systems and methods for per-patient licensing of image processing may be utilized either as a substitute for or in addition to normal software licensing approaches such as the conventional site license. Licensing fees may be determined by negotiation and exemplary embodiments of the present invention may be able to charge different fees for different image processing services. Moreover, fee flexibility may be incorporated into the system, to provide, for example, volume discounts and/or to support a complex schedule of licensing fees.

Figure 5:
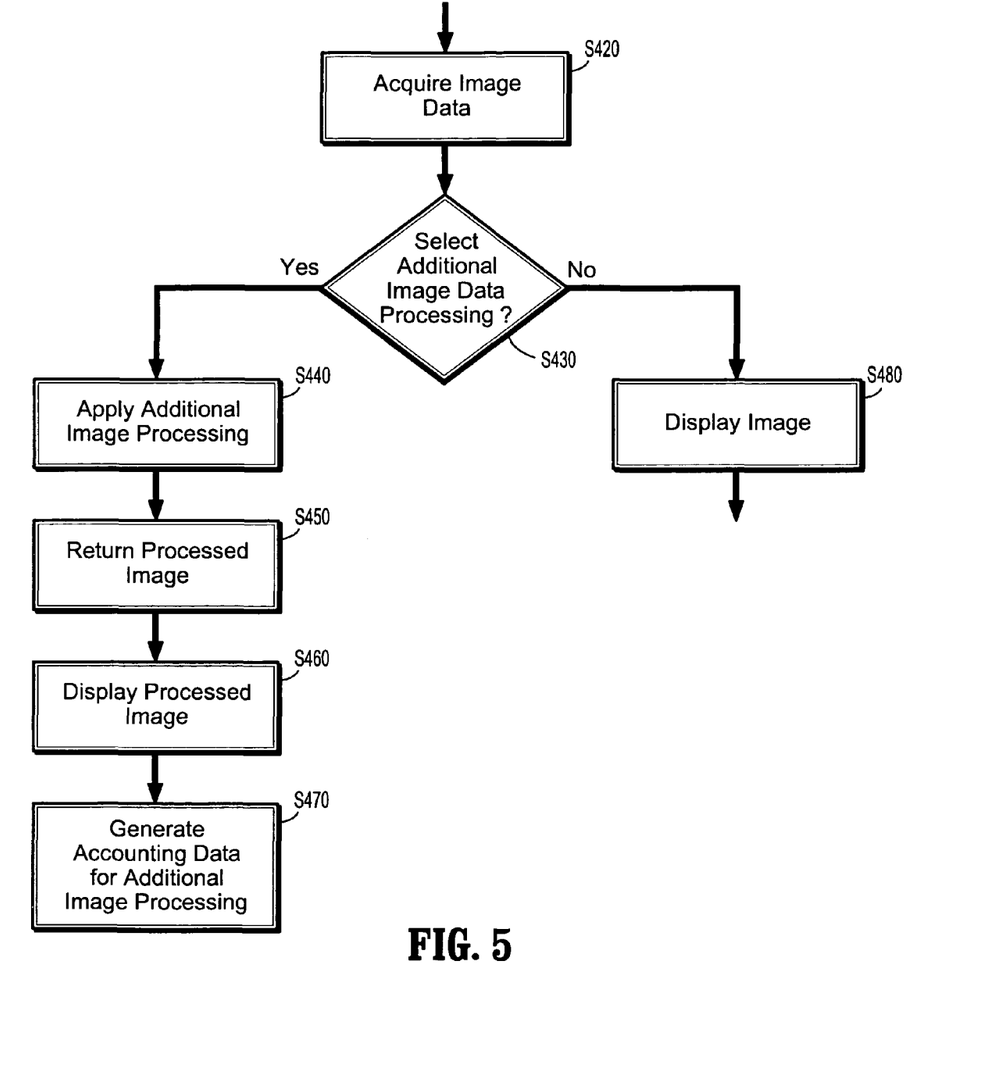
FIG. 5 is a flowchart illustrating a method for charging on a per-patient basis for image processing according to an exemplary embodiment of the present invention.

FIG. 5 is a flowchart illustrating a method for charging on a per-patient basis for image processing according to another exemplary embodiment of the present invention. Image data may be acquired (Step S420). Acquired image data may be provided by an image scanner, a database of image data or from any other image data source. A user, for example a medical practitioner such as a doctor or technician, may determine whether additional image data processing is desired (Step S430). This determination may be made on the basis of medical need. Where no additional image data processing is desired (No, Step S430), the image data may be displayed (Step S480). In this event, no additional image processing fee is applied to the patient's account. Where, however, additional image data processing is desired (Yes, Step S430), additional image processing is applied to the image data (Step S440), for example, as described above. Then, the processed image data is returned to a display station (Step S450) where the processed image data is displayed (Step S460). The displayed processed image data may be used for diagnostic purposes and/or interventional purposes, for example, to assist the medical practitioner in conducting a minimally-invasive procedure. Accounting data indicating the use of the additional image processing is generated and applied to the patient's account so that the use of the additional image processing may be charged on a per-patient/per-use basis.

The method and system of the present disclosure may be implemented on a computer system, for example, the computer system shown in FIG. 1 and described above. The system and method of the present disclosure may be implemented in the form of a software application running on the computer system, for example, a mainframe, personal computer (PC), handheld computer, server, etc. The software application may be stored on a recording media locally accessible by the computer system and accessible via a hard wired or wireless connection to a network, for example, a local area network, or the Internet.

Each workstation and/or mainframe computer that makes up the computer system described above may include, for example, a central processing unit (CPU), random access memory (RAM), an interface to a printing means, a display unit, a local area network (LAN) data transmission controller, a LAN interface, a network controller, an internal bus, and one or more input devices, for example, a keyboard, mouse etc. The computer system may be connected to a data storage device, for example, a hard disk such as a RAID array and/or a network storage device.

The above specific embodiments are illustrative, and many variations can be introduced on these embodiments without departing from the spirit of the disclosure or from the scope of the appended claims. For example, elements and/or features of different illustrative embodiments may be combined with each other and/or substituted for each other within the scope of this disclosure and appended claims.

What is claimed is:

1. A method for implementing per-use licensing for image processing software, comprising:
processing image data using image processing module running image processing software;
displaying the processed image data at a reviewing terminal;

receiving instructions indicating whether the processed image data is to be kept or reacquired;

when the received instructions indicate that the processed image data is to be retaken, the steps of processing the image data, displaying the image data and receiving the instructions are repeated;

when the received instructions indicate that the processed image data is to be kept, the following steps are performed:

exporting the processed image data;

logging the per-patient use of the image processing software in an accounting database when the processed data are exported;

referencing definition files stored within an accounting module to determine whether a type of the processing performed on the image data by the image processing module matches one or more events that are defined within the definition files as events to be accounted for;

assessing a software licensing fee for the use of the image processing software using the accounting module when the type of processing performed on the image data matches one or more of the events to be accounted for; and charging a hospital or healthcare practice facility when the software licensing fee has been assessed.

2. The method of claim 1, wherein after processing the image data, the processed image data are encrypted and prior to exporting the processed image data, the encrypted processed image data are decrypted, and wherein the logging of the per-patient use of the image processing module software comprises recording when processed image data are decrypted.

3. The method of claim 1, wherein the exporting of the processed image data comprises storing the processed image data to a removable medium.

4. The method of claim 1 wherein the exporting of the processed image data comprises storing the processed image data to a storage device connected via a computer network.

5. The method of claim 1, wherein the exporting of the processed image data comprises handing off the processed image data to an application.

6. The method of claim 1, wherein the assessing the software licensing fee for the use of the image processing software comprises periodically transmitting the accounting database.

7. The method of claim 1, wherein the processed image data are exported in accordance with DICOM standards.

8. The method of claim 1, wherein the processed image data are displayed at a terminal and the displayed image data are used for diagnostic purposes.

9. The method of claim 1, wherein the processed image data are displayed at a terminal and the displayed image data are used for interventional purposes.

10. The method of claim 1, wherein the image data are acquired from an image scanner prior to being processed.

11. The method of claim 1, wherein the accounting database is located on a Hospital Information System (HIS) or Radiology Information System (RIS), data relating to the use of the image processing software are sent to the HIS or RIS, and access to the accounting database is provided from the HIS or RIS for account settlement.

12. The method of claim 1, wherein the processed image data are exported to a Hospital Information System (HIS) or Radiology Information System (RIS).

13. A system for implementing per-use licensing for image processing software, comprising:

a terminal for receiving image data;

an image processing module for processing the image data using image processing software;

a terminal for displaying the processed image data and receiving instructions indicating whether the processed image data is to be kept or reacquired; and an accounting module, including one or more definition files indicating events to be accounted for, said accounting module accounting for per-patient use of the image processing software when said processing of the image data is determined to be an event to be accounted for as defined within the one or more definition files; and an accounting database for storing the accounting data so that a software licensing fee for the use of the image processing software can be assessed to a hospital or healthcare practice facility where the image data is processed.

14. The system of claim 13, wherein the terminal for receiving image data receives the image data from one or more sensors for acquiring image data.

15. The system of claim 14 wherein, the one or more sensors for acquiring image data are medical imaging devices.

16. The system of claim 13, further comprising a front-end application for receiving the processed image data from the image processing module and displaying the processed image data on the terminal for displaying.

17. The system of claim 13, wherein the processed image data are exported to a remote storage device or removable medium.

18. The system of claim 13, wherein the stored accounting data are accessed by a billing application to generate invoices for the use of the image processing software.

19. The system of claim 13, further comprising a Hospital Information System (HIS) or Radiology Information System (RIS) for receiving the accounting data.

20. The system of claim 13, further comprising a Hospital Information System (HIS) or Radiology Information System (RIS) for receiving the processed image data.

21. A computer system comprising:

a processor; and a program storage device readable by the computer system, embodying a program of instructions executable by the processor to perform method steps for implementing per-use licensing for image processing software, the method comprising:

processing data using a data processing module running data processing software;

exporting the processed data;

logging the per-patient use of the data processing software in an accounting database when the processed data are exported;

referencing definition files stored within an accounting module to determine whether a type of the processing performed on the image data by the image processing module matches one or more events that are defined within the definition files as events to be accounted for;

assessing a software licensing fee for the use of the image processing software using the accounting module when the type of processing performed on the image data matches one or more of the events to be accounted for; and charging a hospital or healthcare practice facility when the software licensing fee has been assessed, wherein the accounting database is used to generate an invoice for the use of the data processing software on a per-patient basis.

22. The computer system of claim 21, wherein the data are image data acquired from one or medical imagers that have scanned a patient and the processed data are processed image data.

23. The computer system of claim 21, wherein the exporting of the processed data comprises handing off the processed data to an application.

24. The computer system of claim 22, wherein the processed image data are exported in accordance with DICOM standards.

25. The computer system of claim 21, wherein the accounting database is located on a Hospital Information System (HIS) or Radiology Information System (RIS).

26. The method of claim 21, wherein the processed data is exported to a Hospital Information System (HIS) or Radiology Information System (RIS).

* * * * *